United States Patent
Postadan

[19]

[11] Patent Number: 5,961,264
[45] Date of Patent: Oct. 5, 1999

[54] MULTI-THREADED NUT ASSEMBLY HAVING TILTED BARREL SECTION

[75] Inventor: Reynaldo Postadan, Jersey City, N.J.

[73] Assignee: Transtechnology Corp., Liberty Corners, N.J.

[21] Appl. No.: 09/037,604

[22] Filed: Mar. 10, 1998

[51] Int. Cl.⁶ .................................................. F16B 37/02

[52] U.S. Cl. .......................... 411/174; 411/427; 411/936

[58] Field of Search .................................. 411/174, 175, 411/427, 520, 230, 936

[56] References Cited

U.S. PATENT DOCUMENTS

| | | | |
|---|---|---|---|
| 2,031,530 | 2/1936 | Essick | 411/230 |
| 2,731,543 | 1/1956 | Appleton | 411/936 |
| 3,426,818 | 2/1969 | Derby | 411/175 |
| 4,396,326 | 8/1983 | McKinnie | 411/175 |
| 5,423,646 | 6/1995 | Gagnon | 411/174 |

OTHER PUBLICATIONS

Industrial Fasteners and Closures Catalog IF93 Palnut Fasteners.
TRW Catalog PAL 91M Palnut Metric Fasteners.

*Primary Examiner*—Flemming Saether
*Attorney, Agent, or Firm*—Wall Marjama Bilinski & Burr

[57] ABSTRACT

A nut for interconnecting a pair of panel sheet components includes an upper and a lower nut plate. The upper nut plate includes a conical barrel portion to allow angled relative to a vertical axis of the assembly, the base plate having an axial clearance opening for accommodating a threaded fastener. The lower and upper nut plates are separated by a gap sized to accommodate one of the panel components therebetween, having a sized opening aligned with openings in the two sheets, with the barrel portion angled to facilitate assembly of the panel to a separate portion obliquely angled relative thereto. Preferably, the interconnecting portion includes a cutout portion to facilitate push-on of the assembly to a panel or sheet component with a portion of the clamping surfaces being raised with respect to the sheet component to minimize rotation of the nut during clamping.

15 Claims, 2 Drawing Sheets

5,961,264

MULTI-THREADED NUT ASSEMBLY HAVING TILTED BARREL SECTION

FIELD OF THE INVENTION

The invention relates to the field of fasteners, and more specifically to a multithreaded nut useful in the assembly of plastic or metal sheet panels, such as those used in the automotive industry.

BACKGROUND OF THE INVENTION

There are several known situations requiring interconnection between at least two panel or sheet-like components. These situations are prevalent in the automotive industry; for example, as relating to the attachment of a molded plastic bumper fascia to a portion of the sheet metal automobile body using screws, threaded bolts, or other similar fasteners. Normally, such assemblies involve overlapping an edge of one of the components onto the remaining component and inserting fastener(s) through aligned openings in each of the panels to complete the assembly.

Known locking assemblies, including those commonly referred to as U-Nut assemblies, such as those manufactured and sold by Transtechnology Corporation, facilitate the assembly of sheet or panel-like components. These assemblies comprise a spring clip member which includes a pair of plates having a predetermined spacing into which an edge of a first panel component is introduced and clamped. A second panel component is then assembled to the first panel component using at least one threaded fastener inserted through corresponding and aligned openings formed in each of the panel components and the spring clip member. The fastener engages with corresponding threads found in a conical barrel portion extending from one of the clip member plates.

Often, however, the assembly of the panel components takes place along oblique angles which hinders access to the threaded fasteners. Put another way, the components, as assembled, are presented at an angle which would not allow for a vertical or horizontal mounting surface.

The complexity and awkwardness of such assemblies may result in delays due to the difficulty in accessing the fastening assembly, e.g., with a power driving tool. Perhaps, even more importantly, the integrity of such assemblies can be compromised due to warpage, stripping, cracking, or ineffective attachment given the angles which are often involved.

Other related problems can occur in the use of U-nut assemblies. In one instance, considerable force is required to place and/or remove the nut relative to a retained panel component. In addition, there is also a tendency for the nut to rotate during clamping. Each of these problems can further exacerbate the use of known U-nut assemblies.

SUMMARY OF THE INVENTION

In view of the foregoing, it is a primary object of the present invention to improve the field of fastening assemblies.

It is another primary object of the present invention to provide a nut assembly which allows simple and reliable interconnection of sheet components which are assembled along oblique angles.

Therefore, and in accordance with a preferred aspect of the present invention, a threaded nut is provided for use with sheet or panel components which are assembled at mounting surfaces which an oblique angle, said nut comprising:

a first nut plate;
a second nut plate;
a base portion interconnecting said first and second nut plates at one end thereof; and
a cylindrical barrel portion extending from said first nut plate, in which said first and said second nut plates define a spacing sized to allow a first sheet component to be clamped therebetween, said cylindrical barrel portion being tilted relative to said first and second nut plates by a predetermined angle for allowing an assembly between said first sheet component and at least one other sheet component placed adjacent said second nut plate, each of said nut plates, said cylindrical barrel portion, and said sheet components having aligned openings sized for allowing a threaded fastener to pass therethrough, said cylindrical barrel portion being aligned in one of a vertical or horizontal orientation for facilitating assembly of said fastener.

According to another preferred aspect of the present invention a nut assembly is described for use with a manufacturing assembly of a pair of sheet components interconnected by threaded fastening means, said sheet components being assembled in an overlapping fashion, said overlapping region defining an oblique angle relative to one of a horizontal and a vertical plane, said nut assembly comprising:

a first nut plate;
a second nut plate;
a base portion interconnecting said first and second nut plates;
a cylindrical barrel portion extending from said first nut plate, wherein said first and said second nut plate define a predetermined spacing sized to allow a first sheet component to be clamped therebetween, each of said nut plates, said cylindrical barrel portion and said first sheet component having aligned openings sized for allowing a threaded fastener to pass therethrough, and in which said cylindrical barrel portion is tilted by a predetermined angle relative to said first and second nut plates, said predetermined angle being substantially equal to the oblique angle of said panel components for allowing a threaded fastener to be introduced through aligned openings in said panel components and said nut plates, whereby said fastener passes into said cylindrical barrel portion having a threaded portion for engaging said fastening means said cylindrical barrel portion being aligned in one of a horizontal and a vertical orientation for facilitating assembly using fastening means.

In a preferred embodiment, the base portion of the nut includes a recessed portion which allows the nut to be pushed onto a panel component with less force than conventional U-nut assemblies currently used.

In addition, the nut also preferably includes a raised portion on the interior of one of the nut plates along a portion of the clamping surface. Preferably the raised portion is located in the vicinity of the aligned openings which engages the first panel component during clamp torquing, and minimizes the amount of rotation to prevent surface warping of either sheet component. This anti-rotation feature allows the U-nut assembly to move within the constrain of the diameter hole in the panel.

Another advantage of the present invention is that providing a tilted barrel with an increased thread height solves entry and access problems associated with the engagement of a power tool. The added thread height allows the bolt or other threaded fastener to align itself before engagement with the nut threads. This feature therefore assists in preventing cross threading and subsequent repair work.

Yet another advantage of the present invention is that providing a recessed cutout on the interconnecting portion between the spaced nut plates of the described nut provides ease and increased flexibility during push-on to the panel or sheet material. This provision also allows the nut assembly to be easily modified to accommodate a range of different panel or sheet thicknesses.

These and other objects, features, and advantages will be described in the following Detailed Description of the Invention which should be read in conjunction with the accompanying drawings.

DETAILED DESCRIPTION OF THE INVENTION

The following relates to a specific embodiment of the present invention. Throughout the course of discussion several terms such as "upper", "lower", "inner", "outer", "inside", "top", "bottom" and "outside" are used to provide a frame of reference in conjunction with the accompanying drawings. This description, however, should not be limiting of the invention as presently claimed.

Figure 1:
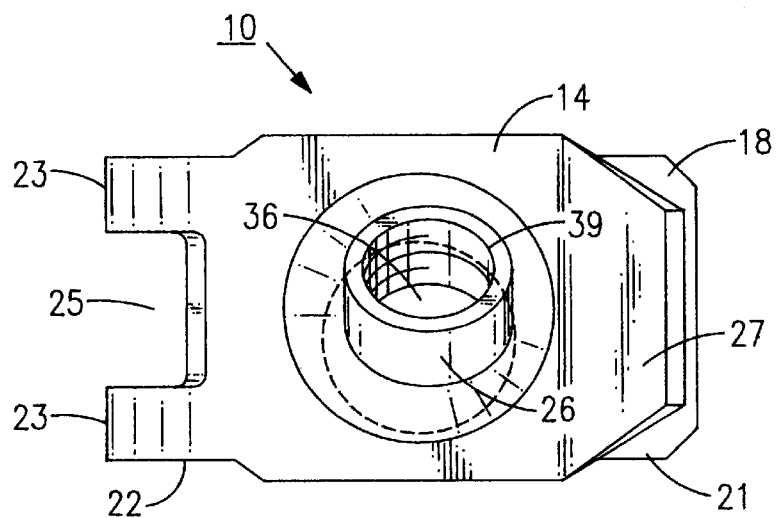
FIG. 1 is a plan view of a nut assembly made in accordance with a preferred embodiment of the present invention.
Figure 2:
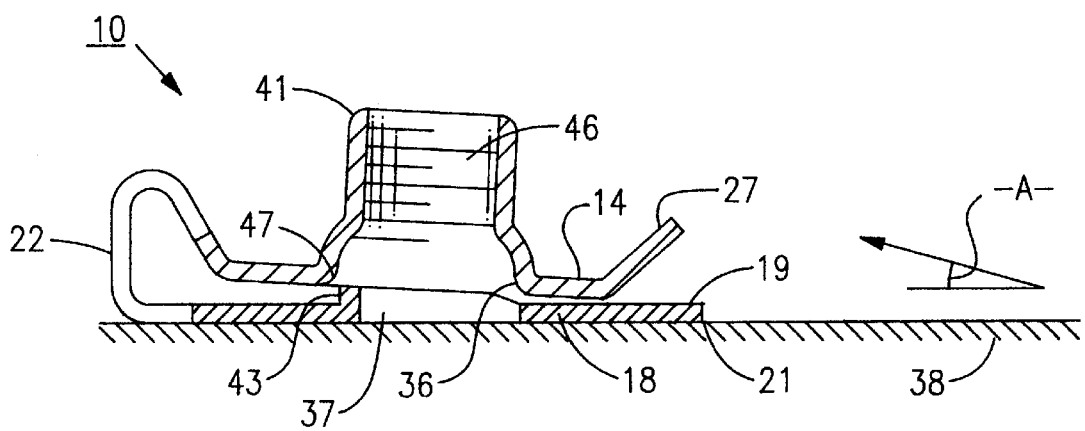
FIG. 2 is an side elevational view of the nut assembly of FIG. 1.
Figure 3:
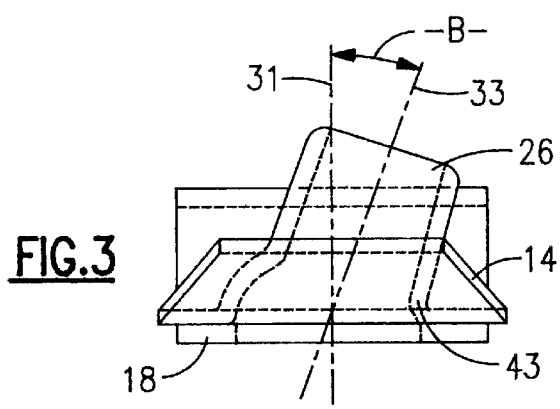
FIG. 3 is an end view of the nut assembly of FIGS. 1 and 2.

Referring to the drawings and more specifically to FIGS. 1–3, there is provided a nut 10 fabricated from a single sheet of spring steel material including an upper nut plate 14 and a lower nut plate 18. The single sheet of material, according to this embodiment, has a thickness of approximately 0.89 mm (0.039 inches), and the nut 10 is fabricated, using known forming techniques, from SAE-1050-SAE-1070 spring steel having a Rockwell hardness of approximately 30N 60–70. As noted, the above parameters relate to a specific embodiment, and it should be realized to those of ordinary skill in the field that other suitable sizes and choices of materials can be easily substituted.

The upper and lower nut plates 14, 18 are interconnected at one end of the nut 10 by an integral base portion 22. The interconnecting base portion 22 extends vertically, as shown in FIG. 2, from one end of the lower nut plate 18 and forms a bent configuration tapering downwardly at an angle of approximately 45 degrees and forming the upper nut plate 14. The base portion 22 includes a pair of spring fingers 23 on either side of a recess 25 which preferably extends partially into each of the upper and lower nut plates 14, 18.

Preferably, and according to this embodiment, the upper nut plate 14 is angled relative to the lower nut plate 18, which is substantially parallel to a horizontal plane 38, shown for reference purposes according to FIG. 2. The angle, indicated as -A- is appropriate to define a small spacing at a free end side 21 of the nut 10, the spacing increasing in size toward the base section 22. According to this embodiment, the upper nut plate 14 is angled approximately 7 degrees with the lower nut plate 18. The angling of the upper nut plate 14 defines a minimum spacing at the free end side 21 of the nut 10 to assist in the clamping function relative to a sandwiched panel component. A beveled portion 27 of the upper nut plate 14 extends approximately 45 degrees relative to the lower nut plate 18.

The upper nut plate 14 includes a cylindrical barrel portion 26 extending upwardly therefrom. The cylindrical barrel portion 26 is hollow and includes respective openings 36, 39 at either end thereof. The barrel portion 26 of the present invention is preferably tilted relative to a vertical axis extending through the upper nut plate, shown in FIG. 3 by reference numeral 31. The axis of the cylindrical barrel portion 26 is similarly labeled with the reference numeral 33. According to the described embodiment, the overall tilt of the cylindrical barrel portion 26, represented by angle -B-, is approximately 18 degrees from the vertical axis 31. The significance of this feature is described in greater detail below relative to the assembly of a pair of assembled panel components 50, 54, shown in FIGS. 4, 5.

The cylindrical barrel portion 26 includes a series of internally disposed threads 46, preferably at the distal end 41 thereof, and capable of engaging a corresponding threaded portion of a screw 60, FIG. 4, or other suitable fastener as described in greater detail below. In addition, the opening 36 provided in the proximal end 47 of the cylindrical barrel portion 26 is preferably larger in diameter than the diameter of the opening 39 at the distal end 41.

Each of the upper and lower nut plates 14, 18 include corresponding clearance openings 36, 37, the latter serving as the opening in the proximal end 47 of the cylindrical barrel portion 26. The opening 37 in the lower nut plate 18 serves as a clearance hole aligned with the hollow openings 36, 39 of the cylindrical barrel portion 26 and is offset slightly therefrom.

The interior surface 19 of the lower nut plate 18 includes a locally raised portion 43 disposed about one side of an alignment opening 36. Preferably, and as more clearly illustrated in FIGS. 2 and 3, the raised portion 43 tapers in its height dimension to a maximum at the middle and a minimum at the ends thereof forming a crescent shaped section which extends over a circumferential portion of the opening 37.

Figure 4:
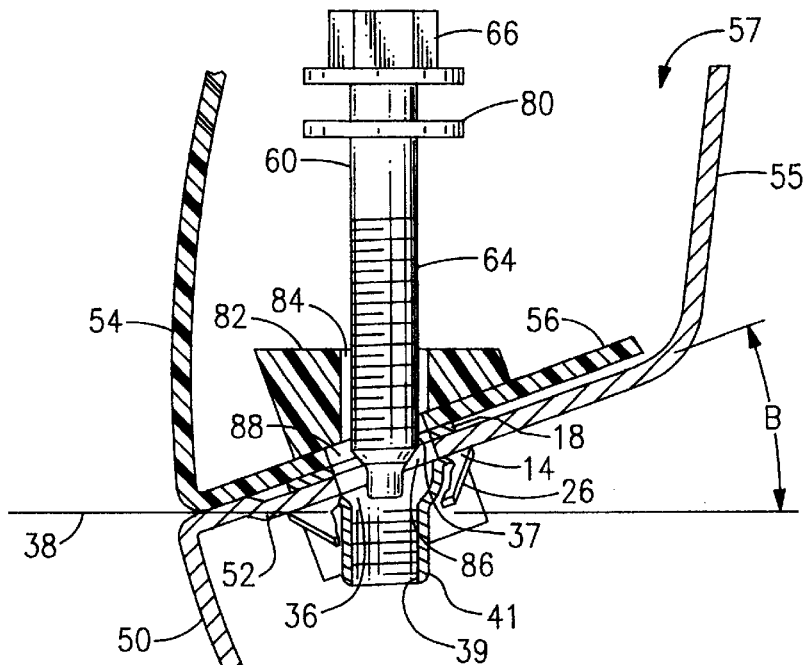
FIG. 4 is partial sectional view showing the engagement of a threaded fastener in the fastening of a panel sheet using the nut assembly of FIGS. 1–3.
Figure 5:
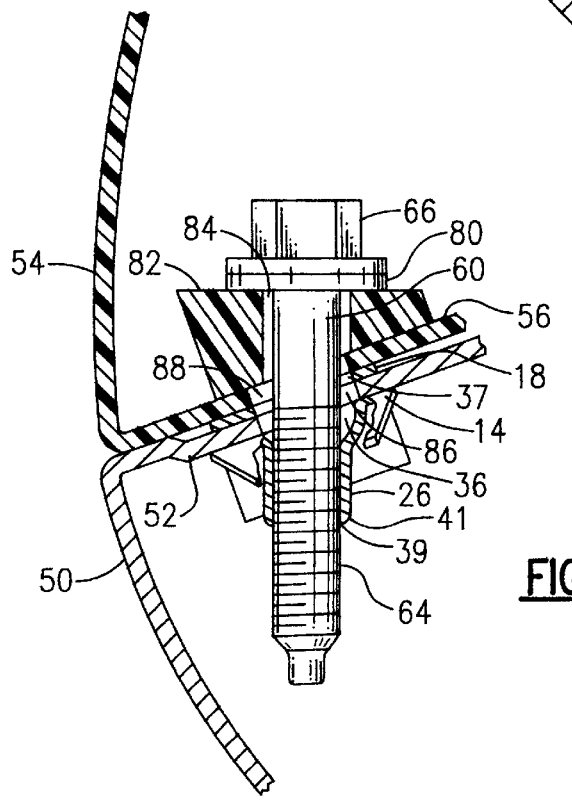
FIG. 5 is a partial sectional view of the assembly of FIG. 4, rotated by approximately 20 degrees, showing the engagement of a threaded fastener at the completion of assembly.

Turning more specifically to FIGS. 4 and 5, the use of the described nut 10 will now be explained relative to a specific automobile assembly including a plastic bumper fascia 54, which is attached to a sheet panel portion 50 of an automobile body, more specifically to a portion of the fender wall. As illustrated, each of the components 50, 54 are panel or sheet sections including respective side edges 52, 56 which are placed in abutting contact one over the other. The automobile body panel 50, 52 further extends to a vertical portion which forms a wall 55 of a cavity or well 57 (shown only in FIG. 4). Due to the curvature of the panel components 50, 54, an angle is developed between an attachment plane defined by the overlapping side edges 52, 56 and the previously referred to horizontal plane 38. As shown in FIG. 4, this angle is substantially equal to the oblique angle -B-, representing the tilt angle of the cylindrical barrel portion 26.

The nut 10 is used to interconnect the above described panel components 50, 54. Initially, a portion of the body edge 52 is introduced into the spacing defined between the upper and lower nut plates 14, 18. The spacing at the free end side 21 of the nut 10, FIG. 2, is smaller than the thickness of the inserted panel to provide a clamping function. Due to the removal of material in the recess 25, however, of the interconnecting base portion 22, the amount of force required to push the nut 10 onto the edge 52 is reduced, though the amount of clamping or bearing force on the surfaces of this panel component is not appreciably affected. In addition, the beveled portion 27, FIG. 2, guides and therefore assists to allow attachment and removal of the inserted panel component during the clamping step.

Still referring to FIGS. 3 and 4, a screw 60 or other suitable fastener having an elongated and threaded engagement portion 64 extending from a screw head 66 is used in conjunction with the nut 10, FIG. 1, for interconnecting the body panel 50 and the bumper fascia 54. According to this embodiment, and prior to attachment of the screw 60, a plastic spacer 82 is also provided which is mounted over the side edge 56 of the bumper fascia 54.

The engagement portion 64 is inserted through an opening 84 in the spacer 82, as well as oversized openings 86, 88 provided in the bumper fascia panel edge 56 and the automobile body edge 52, respectively, aligned with the spacer opening. Each of the openings 84, 86, 88 are aligned, ie: angled, relative to the axis 33, FIG. 3, of the tilted cylindrical barrel portion 26 of the attached nut 10, FIG. 2. The angle and the setback of the tilted cylindrical barrel portion 26 allows engagement with the threaded engagement portion 64 after the screw 60 has first been aligned.

The offset of the opening 37 of the lower nut plate 18 allows proper alignment of the screw 60 with the opening of the proximal end 47 of the cylindrical barrel portion 26. The distal threaded portion of the cylindrical barrel portion 26 also allows the engagement portion 64 to engage therewith after the screw 60 has been properly aligned.

The raised portion 43 provided on the interior surface 19 of the lower nut plate 18 minimizes any surface warping which could otherwise occur during clamp torquing of the screw 60 to prevent the nut 10 from rotating and potentially impinging upon the bumper fascia material 54. The nut 10 therefore moves within the constrain of the opening in the body panel 50 during torquing of the screw 60. A washer 80 inserted between the screw head 66 and the spacer 82 completes the assembly.

Providing a tilted barrel portion with an increased thread height solves entry and access problems associated with the engagement of a power tool (not shown). That is, the added thread height of the cylindrical barrel portion 26 allows the screw 60 or other suitable threaded fastener to align itself before engagement with the nut threads 46. This feature therefore assists in preventing cross threading and subsequent repair work.

Though the present invention has been described in terms of a specific embodiment, it will be appreciated that modifications and variations are possible by those of ordinary skill in the field to the concepts embodied herein. These modifications and variations are intended to remain within the confines of the invention according to the following appended claims.

I claim:

1. A threaded nut for use with sheet or panel components which are assembled at an oblique angle relative to one of a horizontal and vertical plane, said nut comprising:

a first nut plate;

a second nut plate;

a base portion interconnecting said first and second nut plates at one end thereof; and a cylindrical barrel portion extending from said first nut plate, said first and said second nut plates defining a spacing adapted to allow a first sheet component to be clamped therebetween, said cylindrical barrel portion being tilted relative to said first and second nut plates by a predetermined angle for facilitating an assembly between said first sheet component and at least one other sheet component placed adjacent said second nut plate, each of said nut plates, said cylindrical barrel portion, and said sheet components having aligned openings adapted to allow a threaded fastener to pass therethrough, said cylindrical barrel portion being aligned in one of a horizontal and vertical orientation to facilitate assembly of said fastener in which the predetermined angle effectively offsets the oblique angle of said panel components.

2. A threaded nut as recited in claim 1, wherein the end of said first nut plate opposite said base portion is angled about 45 degrees to facilitate attachment and removal of said first sheet component between said nut plates.

3. A nut assembly for use with a manufacturing assembly of a pair of sheet components interconnected by a threaded fastener, said sheet components being assembled in overlapping fashion, said overlapping region defining an oblique angle relative to one of a horizontal and a vertical plane, said nut assembly comprising:

a first nut plate;

a second nut plate;

a base portion interconnecting said first and second nut plates;

a cylindrical barrel portion extending from said first nut plate, wherein said first and said second nut plate define a spacing adapted to allow a first sheet component to be clamped therebetween, each of said nut plates, said cylindrical barrel portion and said first sheet component having aligned openings adapted for allowing a threaded faster to pass therethrough, and in which said cylindrical barrel portion is tilted by a predetermined angle relative to said first and second nut plates, said predetermined angle adapted to be substantially equal to the oblique angle defined by said overlapping region for allowing said threaded fastening means to be introduced through aligned openings in said barrel portion, said panel components and said nut plates, in one of a horizontal and a vertical orientation to facilitate assembly.

4. A nut assembly as recited in claim 2, wherein the predetermined angle of said cylindrical barrel portion is in the range of between approximately 10 and 30 degrees.

5. A nut assembly as recited in claim 3, wherein said cylindrical barrel portion includes an internally threaded portion, said threaded portion being disposed at a distal end thereof.

6. A nut assembly as recited in claim 3, wherein said base portion includes a recessed portion for reducing the amount of force required to initially clamp said first and second nut plates onto said first panel component.

7. A nut assembly as recited in claim 6, wherein said recessed portion includes corresponding portions of at least one of said first and second nut plates.

8. A nut assembly as recited in claim 6, wherein said assembly includes antirotation means for resisting rotation of said nut during clamping to said sheet component.

9. A nut assembly as recited in claim 8, wherein said antirotation means includes at least raised one engagement surface on an interior portion of one of said first and said second nut plates, said at least one raised portion being disposed for engaging said first sheet component and for preventing said nut from rotating when said sheet component is introduced into the spacing between said nut plates.

10. A nut assembly as recited in claim 6, wherein said recessed portion includes interconnected cutout portions of said base portion and each of said first and second nut plates.

11. A nut assembly as recited in claim 3, wherein said nut assembly is fabricated from spring steel.

12. A nut assembly as recited in claim 11, wherein said nut assembly is made from a unitary section of material.

13. A nut assembly as recited in claim 3, wherein said first nut plate is angled relative to said second nut plate, such that spacing between said nut plates is greater at the base portion than at the free ends of said plates.

14. A nut assembly as recited in claim 13, wherein the angle of said first nut plate relative to said second nut plate is in the range of approximately 2–10 degrees.

15. A nut assembly as recited in claim 3, wherein the end of said first nut plate opposite said base portion is angled about 45 degrees to facilitate attachment and removable of said sheet component between said nut plates.

* * * * *

UNITED STATES PATENT AND TRADEMARK OFFICE
CERTIFICATE OF CORRECTION

PATENT NO. : 5,961,264
DATED : October 5, 1999
INVENTOR(S) : Reynaldo Postadan

It is certified that error appears in the above—identified patent and that said Letters Patent is hereby corrected as shown below:

On Claim 3, Column 6, Line 36, please delete the word "faster" and insert the word --fastener--.

On Claim 3, Column 6, Line 41, please delete the words "fastening means" and insert the word --fastener--.

On Claim 3, Column 6, Line 43, please delete "plates," in favor of --plates--.

One Claim 4, Column 6, Line 46, after the word claim please delete "Claim 2" in favor of --Claim 3--.

Signed and Sealed this

Twenty-first Day of March, 2000

Q. TODD DICKINSON

*Attest:*

*Attesting Officer*  *Commissioner of Patents and Trademarks*